Patented July 6, 1926.

1,591,723

UNITED STATES PATENT OFFICE.

EDMUND C. MISSBACH, OF BERKELEY, CALIFORNIA.

PROCESS OF MAKING ALKALI-METAL XANTHOGENATES.

No Drawing.   Application filed June 1, 1925. Serial No. 34,177.

My invention is a process of making xanthogenates of alkali-metals, sometimes termed alkali-metal xanthates.

An object of my invention is to form the alkali-metal xanthogenates without the usual side reactions experienced in the processes commonly practiced which render the product impure. Another object is to produce stable alkali-metal xanthogenates without using water in the process and avoiding the use of solvents or liquids containing water or salts containing water of crystallization. A further object is to produce a product either in crystalline or granular from direct without formation of any mother liquor and in which substantially the only water is that of one molecule of water of crystallization. Another feature of my invention is to form a solution of an anhydrous mono-hydric alcohol and carbon bisulfide. This solution may be used with a dry alkali-metal hydroxide in the absence of water.

*Previous processes.*—Some of the previous processes for making alkali-metal xanthates use more or less dilute alcohol, carbon-bisulfide, and an alkali-metal hydroxide with water, or the alkali-metal hydroxide containing water of crystallization is used and the material allowed to react. In these procedures the water in introduced as a dilutent of the alcohol, or as water of crystallization in the hydroxide or simply added as a solvent of the alkali-metal hydroxide, and sometimes the water is added during the course of the process.

In these processes in the presence of water as above mentioned even if the reaction mixture is cooled externally or mixed with a suitable volatile inert compound which does not enter the reaction in order to reduce the speed of such reaction side reactions will take place. These side reactions form especially sulfo-carbonates (or thio-carbonates as they are also termed) in considerable quantities, the presence of which is indicated by a more or less dark reddish colored end product and by a peculiar shape of the crystals of the latter and by its distinguishing odor and also by analysis. These alkali-metal sulfocarbonates as, e. g.

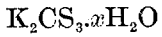

or

formed in the side re-actions reduce the purity of the desired alkali-metal xanthogenates sometimes to such an extent as to make the same unfit for many industrial purposes, but these impurities also have the tendency to bring about further deterioration of the alkali-metal xanthogenates and making the latter less stable. For, when alkali-metal xanthogenates are heated in the presence of water at temperatures from 80° C. upwards will decompose into alcohol, alkali-metal sulfocarbonates, hydrogen sulfide and carbon dioxide. The same decomposition will similarly take place although more slowly when the alkali-metal xanthogenates are exposed to moist air even at normal temperatures and the decomposition, moreover, under these circumstances will be greatly facilitated by the presence of alkali-metal thiocarbonates.

In some of the prior processes the alcohol used contains at least 7% of water by weight, generally considerably more and in addition to this some procedures add water or utilize the mother liquor originated from former operations, which besides its water content has various impurities. It has been considered in the past necessary to use an excess of water to keep the alkali-metal hydroxides in solution until the reactions are complete. It has been recommended to utilize an alcohol of from 90 to 95 volume percent, but ethyl alcohol of this strength for instance corresponds to a water content of the alcohol of from 7.6% to 14.3% by weight. All these processes above mentioned, therefore, favor the formation of large quantities of mother liquor which in turn must be removed from the alkali-metal xanthogenates crystals, thus causing a considerable loss of crystals and at the same time making the process unnecessarily difficult and expensive.

Another detriment of the prior processes is the separation of the crystals from the mother liquor which are generally removed therefrom by suction filters or by centrifugal machines with subsequent washing of the crystals by a suitable volatile liquid agent. By these operations the laborer is exposed to poisonous and annoying vapors and gases for which little or no protection can be provided: and also during the handling of the wet and unfinished product there is also a danger of irritating skin attacks. The above mentioned draw-backs do not occur with my process and the workmen do not come into contact with the unfinished product.

*My process in brief.*—My process stated briefly comprises using an anhydrous, monohydric alcohol utilizing no excess of either alcohol or alkali-metal hydroxide and no water with the alkali-metal hydroxide, i. e. I use no water either as a dilutent or a solvent nor incorporate any substance containing water. I utilize the ingredients in substantially the quantities of their molecular weights and secure as a product practically the full chemical equivalents thereof. The equation may be expressed as follows: using ethyl alcohol and sodium hydroxide:

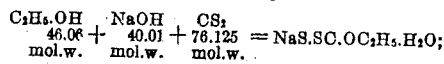

the reactions being quantitative and the water formed is taken up by the alkali-metal xanthogenate in the form of water of crystallization. I may use a number of different monohydric alcohols such being anhydrous, for instance, ethyl, methyl, butyl-alcohol and a number or other alcohols which could come in consideration for this purpose. I take advantage of the fact that these anhydrous alcohols can now be obtained on the market in commercial quantities at very moderate prices. These anhydrous alcohols can be mixed with carbon bisulfide to form a solution in any desired proportion without any separation of either the alcohol or the carbon bisulfide. Depending on the relative strength these mixtures may be considered either as a solution of alcohol in carbon bisulfide or a solution of carbon bisulfide in the alcohol.

These mixtures are very reactive towards alkali-metal hydroxides and when these ingredients are allowed to react being mixed in their molecular proportions: and such reactions are carried out very slowly under sufficient cooling and proper stirring, the reaction is complete without any side reactions. A substantially pure alkali-metal xanthogenate is formed containing only one molecule of water of crystallization. The product is very pure and contains only approximately one molecule of water of crystallization. They may be produced either in crystalline or a granular form which may be afterwards powdered and are very stable. For instance I have found that in utilizing sodium hydroxide with a purity of 98% NaOH having approximately 2% moisture content I obtain a product corresponding approximately to 88% anhydrous sodium xanthogenate the balance consisting of water crystallization. The product is substantially a perfectly dry substance and may be powdered as fine as dust. It will not cake nor form into lumps nor deteriorate when stored in air-tight and moisture proof containers under normal conditions for a reasonable period. It is suitable for all industrial purposes where alkali-metal xanthogenates of highest purity are required.

Usually alkali-metal xanthogenates are used for industrial purposes in the form of comparatively diluted solutions. If an absolutely dry or anhydrous alkali-metal xanthogenate is desired my product either in the crystalline, granulated or powder form may be subjected to a drying procedure to remove the water of crystallization. This drying may be accomplished in a suitable drying apparatus by a current of dry and warm air or an inert gas e. g. nitrogen preferably under reduced atmospheric pressure and at a temperature below the decomposition point of the compound.

In the above discussion of my process I have considered all of the ingredients on the basis of one hundred percent purity and corrections should be made according to the purity of the material employed. This refers mainly to the alkali-metal hydroxide although commercial materials of the highest purity obtainable should be employed only.

Commercial application of my process using ethyl alcohol.

In using ethyl alcohol in the anhydrous denatured form sometimes designated (ethanol), I utilize 4606 parts by weight which contains 4.64% by weight of anhydrous methyl alcohol. This is in accordance with the U. S. internal revenue special formula No. 1, substituting anhydrous alcohol for 190° proof alcohol as given in the official specifications. With the alcohol I use 7612.5 parts by weight of pure carbon bisulfide ($CS_2$) and 4001 parts by weight of pure dry powdered sodium hydroxide (calculated as 100 percent pure and corresponding to 4082.6 parts by weight of 98 percent pure NaOH).

In the above reaction methyl alcohol (methanol) forms also alkali-metal xanthogenates similar to the ethyl alkali-metal xanthogenate when brought into reaction with carbon bisulfide and an alkali-metal hydroxide. There is, however, a difference of the molecular weight between ethanol and methanol which should be considered. The molecular weight of ethanol is 46.06 and that of methanol 32.04. This shows that according to the equation:

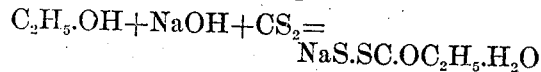

a slight excess of methanol would be introduced into the manufacturing process above mentioned when the denatured anhydrous ethyl alcohol according to U. S. internal revenue special formulæ is employed; however, this excess will be so very small that in practice it will be negligible. However, should it be desired to work with strict accuracy, a correction of the weight of the denatured anhydrous ethyl alcohol could be made very easily, for, one part of methanol is equal to 1.4376 parts by weight of ethanol, and one part by weight of ethanol is equal to 0.6956 parts by weight of methanol.

*Commercial process using ethyl alcohol and potassium hydroxide.*

Denatured anhydrous ethyl alcohol and carbon bisulfide in the same proportions as given above for use with sodium hydroxide but substituting potassium hydroxide using the calculated amount of KOH as required according to the equation:

$$C_2H_5.OH + KOH + CS_2 = KS.SC.OC_2H_5.HO.$$

*Commercial application of process using methyl alcohol.*

The procedure is the same as using ethyl alcohol but utilizing 3204 parts by weight of technically pure anhydrous methyl alcohol (methanol) instead for the quantity of denatured anhydrous ethyl alcohol mentioned above. The pure carbon bisulfide and the pure, dry powered alkali-metal hydroxide in the proportions indicated in the above formulæ.

The ethyl and methyl alcohols may be replaced by any other suitable anhydrous monohydric alcohol, e. g. amyl, butyl alcohols, etc., which are able to form alkali-metal xanthogenates when allowed to react with an alkali-metal hydroxide and carbon bisulfide under proper conditions.

In the above examples which may be considered as commercial formulæ Nos. 1, 2, and 3 respectively, the manufacture of alkali-metal xanthogenates is performed without drying, the product so obtained being in granulated form which may be powdered. If it is desired to obtain crystalline products of the same chemical composition, I use an excess of carbon bisulfide over that given in the above formulæ. The excess of carbon bisulfide which does not re-enter into the reaction may be driven off by raising the temperature somewhat above the boiling point of the carbon bisulfide preferably under reduced atmospheric pressure after the formation of the alkali-metal xanthogenates is completed and recovering the excess of the carbon bisulfide by condensing its vapors.

*Technicalities of operations.*—In carrying out any of my processes above mentioned I mix the calculated amounts of the anhydrous alcohol and the carbon bisulfide together, cooling the mixture to a low temperature preferably below the freezing point of water at normal atmospheric pressure. I have found a temperature of about zero C. is satisfactory. This cooled solution of the anhydrous alcohol and the carbon bisulfide is very slowly added to the proper molecular proportions of a dry finely ground or powdered alkali-metal hydroxide. This is preferably done in a closed vessel provided with an efficient mixing, kneading and triturating or a kneading and grinding device combined. The apparatus must also be provided with a reflux condenser, a thermometer and a cooling device, the latter of which may be utilized or converted into a heating device at will. The reflux condenser should be flexible in order that the same could be used as an ordinary condenser if it were desired to remove the condensed carbon bisulfide vapor from the reaction vessel in case an excess of carbon bisulfide had been used for the manufacture of crystalline alkali-metal xanthogenates. In the removal of the excess $CS_2$ which may be done as above described by removing it from the finished product at reduced atmospheric pressure and without raising the temperature above 30° C.

The temperature of the reaction mixture must be regulated and preferably not allowed to rise above 40° C. and not below 30° C. until the reactions are completed, when the product may be discharged directly into the containers in which it may be stored and shipped.

It will thus be seen that my process for the manufacture of pure alkali-metal xanthogenates in either lumps, granular, or powdered or crystalline form is extremely simple that it may be carried out in a single, simple but specially constructed apparatus which requires the attention of only one operator, therefore saving considerable amount of labor. The process requires no crystallizers, centrifugals, or other liquor removing devices which are not only very important, time saving, but also money saving factors.

*Formation of a stable solution of an anhydrous monohydric alcohol and carbon bisulfide.*

An important sub-step in my complete process is the formation of a stable mixture or solution of anhydrous monohydric alcohol in carbon bisulfide or vice versa in molecular proportion or in proportions with the carbon bisulfide in excess of the proportion of the anhydrous monohydric alcohol. With the mixtures or solutions I prepare it can be shipped by railroad without material danger and the mixture utilized at its destination for forming alkali-metal xanthogenates. It is well known that pure carbon bisulfide itself is a dangerous chemical to ship but my solution has a much higher boiling point, is less inflammable and is not subject to static electric charges, as is the case with pure carbon bisulfide thereby reducing the danger of explosions and ignition of the liquid by electric sparks.

I have ascertained that carbon bisulfide and an anhydrous monohydric alcohol (e. g. ethyl, methyl, or butyl alcohol) will dissolve in each other in any desired proportion. These solutions may be called either an alcoholic solution of carbon bisulfide or a solution of the alcohol in carbon bisulfide. If, however, the alcohol contains water the solubility of carbon bisulfide in diluted monohydric alcohols decreases considerably and the solubility of a diluted monohydric alcohol in carbon bisulfide may become so low, that for practical purposes it would be negligible. For example, denatured ethyl alcohol of 95 volume percent (which contains 92.42 percent alcohol by weight with 7.68% water) in the proportions of 54 to 55 parts by weight will dissolve only from 45 to 46 parts by weight of pure carbon bisulfide at normal temperature, the variation of proportions of dissolved carbon bisulfide depending on the nature and the quantity of the denaturant present in the alcohol. Whereas only a fraction of one percent of denatured ethyl alcohol at the same strength will be soluble in pure carbon bisulfide.

It will thus be seen that by using an anhydrous monohydric alcohol I obtain an anhydrous solution of the alcohol and carbon bisulfide in the proportions required by the formulæ to produce an alkali-metal hydroxide the xanthogenates thereof, or I may readily obtain a solution having a much greater or lesser proportion of carbon bisulfide.

Having described my invention, what I claim is:

1. The method of producing alkali-metal xanthogenates consisting in causing a reaction of a solution of an anhydrous monohydric alcohol in carbon bisulfide on a dry alkali-metal hydroxide the alcohol and the alkali-metal hydroxide being used in molecular proportions.

2. The method of producing alkali-metal xanthogenates consisting in causing a reaction of a monohydric alcohol with carbon bisulfide on a dry alkali-metal hydroxide in which no water or any other substance containing water is used to dilute the reaction mixture.

3. The method of producing alkali-metal xanthogentates as claimed in claim 1, in which all three of the ingredients are utilized in the proportions of their molecular weights.

4. The method of producing alkali-metal xanthogenates comprising forming a solution of an anhydrous monohydric alcohol with carbon bisulfide and causing a reaction of the solution on a dry alkali-metal hydroxide.

5. The method of producing alkali-metal xanthogenates comprising forming a solution of an anhydrous monohydric alcohol with carbon bisulfide and causing a reaction of the solution on a dry alkali-metal hydroxide, in which no water or any other substance containing water is utilized as a dilutent.

6. The method of claim 4 in which ingredients are utilized in the proportion of their molecular weights.

7. The method of claim 4 comprising cooling the solution of the anhydrous monohydric alcohol and carbon bisulfide and adding the solution slowly to the dry alkali-metal hydroxide and cooling and agitating the mixture during the reaction.

8. The process combining an anhydrous monohydric alcohol, carbon bisulfide and a dry, finely crushed, or powered alkali-metal hydroxide to form a solid, pure granulated alkali-metal xanthogenate in a single operation without the formation of a mother liquor and in which the product can be powdered without previous drying.

9. The process as claimed in claim 8 in which an excess amount of carbon bisulfide is used to form a more perfect crystalline product which contains only water in the form of one molecule of water of crystallization and further removing the excess of carbon bisulfide from the product.

10. The process as claimed in claim 8, in which an excess amount of carbon bisulfide is used which is afterwards removed from the product by condensing the carbon bisulfide vapor from the reaction vessel at a pressure below atmospheric and without raising the temperature above 30° C.

11. The process of making alkali-metal xanthogenates comprising reacting an anhydrous monohydric alcohol, carbon bisulfide and an alkali-metal hydroxide in substantially the proportions of their molecular weights to form directly a crystalline or granular product containing water only in the form of water of crystallization.

12. The method of claim 11 comprising in addition drying the product to remove the water of crystallization.

13. The method of claim 11 comprising in addition drying the product to remove the water of crystallization under pressure less than atmospheric and at a temperature below the decomposition point of the compound.

14. The process of making substantially dry alkali-metal xanthogenates comprising making a solution of an anhydrous monohydric alcohol in the proportion of its molecular weight with carbon bisulfide in the proportion of 76.125 parts by weight, cooling the solution and mixing it slowly with sodium hydroxide of 98% purity in the proportion of 40.83 parts by weight, said sodium hydroxide being substantially dry and ground or pulverized, and cooling and stirring the ingredients during the reaction.

15. The method of making alkali-metal xanthogenates comprising utilizing 4606 parts by weight of commercial denatured anhydrous ethyl alcohol containing substantially 4.64% by weight of anhydrous methyl alcohol and 95.36% of ethyl alcohol utilizing therewith pure carbon bisulfide in the proportion of substantially 7612.5 parts by weight and reacting these with pure dry powdered sodium hydroxide of substantially 98% purity, in the proportion of 4082.6 parts by weight.

16. The manufacture of an alkali-metal xanthogenate as a direct product without the formation of mother liquor having water only in the form of water of crystallization.

17. As a direct product an alkali-metal xanthogenate formed without the use of diluent water and without the formation of any mother liquor such product being crystalline or granular and having a water content only in the form of one molecule of water of crystallization.

18. A solution for forming alkali-metal xanthogenates from dry powdered alkali-metal hydroxides consisting of an anhydrous monohydric alcohol and carbon bisulfide with the carbon bisulfide being in direct proportion to the alcohol in accordance with their molecular weights, such solution being stable and having a higher boiling point than carbon bisulfide.

In testimony whereof I affix my signature.

EDMUND C. MISSBACH.